March 13, 1951     A. F. JULIUS     2,544,994
TOTALIZATOR COUNTER STRUCTURE

Filed July 30, 1948     2 Sheets—Sheet 1

Inventor
A. F. Julius
By Glascock Downing Seibold
Attys.

Patented Mar. 13, 1951

2,544,994

UNITED STATES PATENT OFFICE 2,544,994

TOTALIZATOR COUNTER STRUCTURE

Awdry Francis Julius, Sydney, New South Wales, Australia, assignor to Automatic Totalisators Limited, Meadowbank, near Sydney, New South Wales, Australia, a company of New South Wales, Australia Application July 30, 1948, Serial No. 41,574

4 Claims. (Cl. 235—92)

In existing race totalisators, the total of transactions effected in respect of each competitor in a particular event is recorded by an "adding unit" on a counter which is usually of the kind known as a "Veeder" counter. The operating shaft of each counter is drive connected by gears or otherwise to the main counter gear wheel of the adding unit. This gear wheel is constantly influenced to rotate by a slipping clutch, and is permitted to rotate when released by the adding unit escapement mechanism or the like, in such manner that the total rotation of the counter wheel is directly proportional to the total number of transactions effected in respect of the competitor to which the particular adding unit which carries the "Veeder" is peculiar.

When a series of events are to be dealt with, it is frequently a matter of some inconvenience (owing to the shortness of time available between events) for the various counter totals to be noted before the counters can be re-set to zero in readiness for summation of the transactions for a next event. This disability is particularly objectionable where the adding units (and hence the counters to be read) are present in great number, for example, where the totalisator makes provision for events with a large number (say over thirty) competitors; and the disability is further emphasized where "doubles" transactions are to be recorded where, for example, it may be necessary to provide as many as several hundred adding units in order to cater for recording of all the possible doubles transactions on two events. Where the number of adding units is of the order of one hundred or more, it becomes almost impossible for the several counter totals to be noted in the period between two events, unless a wholly impracticable number of count reading operatives are in attendance.

The object of this invention is to provide a simple means whereby the noting of counter totals need not be restricted to the relatively short period elapsing between the end of a transaction run for one event and the beginning of a transaction run for a next event. To this end the main counter wheel in each adding unit is furnished with two or more counters, any one of which may be individually drive engaged with the main counter wheel for the recording of a prevailing transaction run, while the remaining counter or counters is or are disengaged from the main counter wheel, thus to enable count totals for prior events to be noted during the term of a transaction run which follows that in which their count was originally accumulated.

The invention incorporates simple inter-responsive coupling means whereby the drive coupling of one counter to the main counter wheel, automatically places the other counter or counters out of engagement with said wheel. The invention preferably includes simple locking devices whereby the disengaged counter or counters is or are locked against further operation, to hold the recorded total therein; and automatically operating shutter devices whereby only the counter or counters which is or are out of engagement with the main counter wheel (and therefore have a count total accumulated therein) are displayed for reading or noting purposes.

The invention may be summarised as mainly consisting (in a race totalisator adding unit) of a main counter wheel, drive devices whereby the counter wheel may be rotated in correspondence with a count to be recorded, a plurality of counters each having an operating shaft, drive pinions respectively keyed on the operating shafts and interresponsive coupling devices whereby one of the pinions may be drive connected to the counter wheel to the exclusion of the remainder of said pinions.

A preferred embodiment of the invention is illustrated in the drawings herewith.

Figure 2:
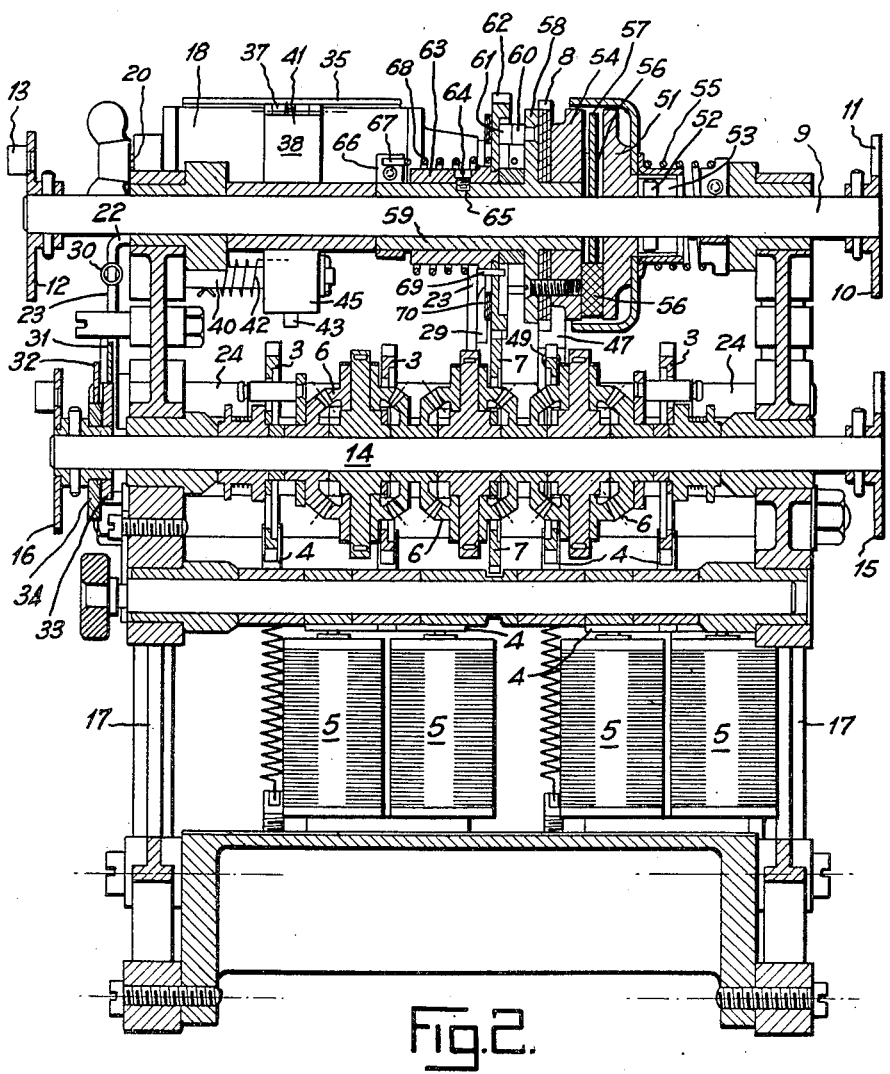
Figure 2 is a sectional side elevation taken on line 2—2 in Figure 1.

The illustrated adding unit is of conventional design insofar as it comprises a plurality of escapement wheels 3, escapement rockers 4 and electromagnets 5 one of which is impulse energised for each transaction to be counted. The escapement wheels are associated, in known manner, with epicyclic gear units 6 which integrate the movement of the several escapement wheels into rotation of a take-off gear 7. The take-off gear is driven by the main counter gear wheel 8. This wheel 8 is mounted (in a manner described later herein) upon a drive shaft 9 which is furnished with means for the continuous rotation thereof while the adding unit is in use. The drive for shaft 9 may be effected by way of a driven plate 10 having a slot 11 therein to receive the drive peg of a driving plate on a motor driven shaft or the like. The driving plate and its peg may be the same as those marked 12 and 13 at the left-hand end of the drive shaft 9 (Figure 2). The drive shaft 9 is preferably provided with driving and driven plates such as 10 and 12, at its ends, so that any selected number of units such as that illustrated, may be drive coupled together in end-to-end alignment. The escapement shaft 14 may, for the purposes of this invention, be similarly provided with a slotted driven plate 15 and a pegged driving plate 16. As all of the items mounted on shaft 14 are freely revoluble relative thereto, it may be fixedly mounted in the unit frame members 17, but for the purposes of operating the previously mentioned inter-responsive coupling devices it may be conveniently employed as a part-rotatable cam shaft as described later herein. Plates 15 and 16 enable coupling of several units as previously explained.

The illustrated embodiment of the invention has two counters, 18 and 19, disposed on opposite sides of the counter wheel 8. These counters are of the known kind having an operating shaft (20) and a sight window (21) through which a count may be read. The counters are fixed on the webs (22) of U-brackets having limbs 23 pivotally mounted on pins 24 fixed in the frames 17.

Each counter-shaft 20 has a drive pinion 25, 26 keyed thereon. These pinions are adapted for drive connection with the counter wheel 8, either by direct meshing or otherwise; for example, by way of idler pinions 27 and 28 mounted on arms 29 fixed to a U-bracket web 23. The idler pinions (if present) remain in constant mesh with the pinions 25 and 26, and are movable at one with the counters and the U-brackets.

The counter brackets (22, 23) are so loaded as to be constantly urged to move towards the counter wheel 8. The loading means may consist of a tension spring 30 anchored to both brackets. The spring 30 is opposed by follower spurs 31 and 32 respectively fixed to the two counter brackets. The spurs 31 and 32 project one towards the other and respectively ride upon a pair of single throw cams 33 and 34 fixed upon a cam operating shaft which for preference is the escapement shaft 14. The two cams are phased 180° apart, so that the minimum throw of one is in line with the maximum throw of the other.

The cam shaft 14 has two effective positions which are 180° apart. The shaft is provided with a hand lever or the like (not shown) with suitable stops or locking means to enable the shaft to move through 180° when it is required to engage one counter with the main counter wheel and at the same time disengage the other therefrom.

In the illustrated preferred embodiment of the invention, a shutter plate (35, 36) is provided for each of the counters, to cover its sight window while it has its drive pinion meshed with the main counter wheel. Each shutter plate is hinged (at 37) on the upper end of a carrier lever 38, 39. These levers are fulcrumed on pins 40 fixed to the unit frame. Each shutter is constrained to lie upon its associated counter by a light loading spring 41 included in its hinge 37. Each lever 38, 39 is loaded by a spring 42 which influences the related shutter to remain withdrawn from its counter window 21 as shown on the left hand side of Figure 1. Each of the counter bracket webs 22 has a striker pin 43, 44 able respectively to bear against the lower ends or tailpieces (45, 46) of the levers 38, 39.

Figure 1:
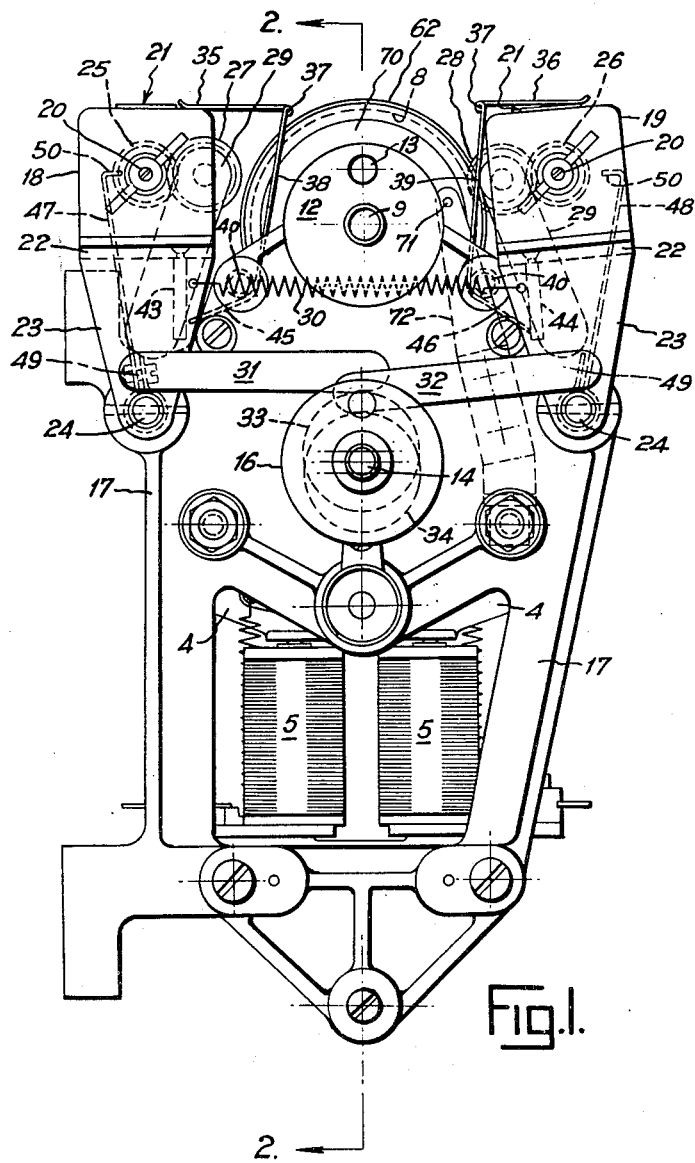
Figure 1 is an end elevation of an adding unit.

In Figure 1 the counter 19 is shown in working position (that is, with its drive pinion 26 drive connected to the counter wheel 8 through the idler pinion 28). Its sight window 21 is covered by the shutter 36 by reason of the striker pin 44 bearing against the tailpiece 46. The counter 18 is in non-working position and its sight window is uncovered by reason of the striker pin 43 being clear of the tailpiece 45. On turning the escapement shaft 14 through 180°, the cams 33, 34 acting on the follower spurs 31, 32 bring counter 18 into working position with its sight window covered, and counter 19 into non-working position with its sight window uncovered.

Means are preferably provided to lock the counters against further operation as they move into their non-working positions. These means may consist of leaf springs 47, 48 fixed (at 49) on the pins 24. Each spring 47, 48 has a pawl tooth 50 which is clear of the related counter pinion (26) when the particular counter is in working position, and engages the related counter pinion (25) as it approaches its non-working position, so to hold it against rotation while in or near that position.

The preferred drive devices whereby the counter wheel 8 is rotated (when so allowed by the escapement and epicyclic gear assembly) in correspondence with a count to be recorded, comprise, a driving clutch plate 51 which is keyed to the shaft 9 by a key 52 within a diametrical slot 53 in the hub of plate 51. Plate 51 is thrust towards a driven member or plate 54 by spring 55, and urges rotation thereof through friction members 56 which are made of cork or the like and are set in a carrier plate 57. The driven plate 54 has the main counter gear 8 fixed thereto. Both plate 54 and gear 8 are fixed to a flange 58 on a bearing sleeve 59 which is freely revoluble on shaft 9. Flange 58 carries a drive peg 60 able to bear against a similar peg 61 on an intermediate gear wheel 62 which meshes the take-off gear 7. Wheel 62 is fixed on a rider sleeve 63 which is freely revoluble on sleeve 59 within the limits imposed by a guide pin in the form of a grub screw 64 extending into a guide slot 65 in sleeve 59. This slot 65 is peripheral (that is, non-helical) for about half the circumference of sleeve 59, and then continues as a short helical portion which is so directed that should the rotation of sleeve 63 sufficiently overtake that of sleeve 59, the sleeve 63 will move endwisely towards the collar 66 fixed on sleeve 59. Collar 66 constitutes an anchorage for one offset end 67 of a motor spring 68. The other offset end 69 of spring 68 enters a hole in gear 62. The effect of spring 68 is to urge rotation of wheel 62 so that its peg 61 tends to move away from and ahead of peg 60 on the counter wheel 8. The gear 62 has a slip ring 70 (of insulatory material) fixed thereon. In the event of the sleeve 63 moving towards the collar 66, the ring 70 closes a pair of normally open contacts 71 on spring arms 72 (one only is shown, Figure 1). These contacts are circuited with a magnetic cut-out switch or the like upon energisation of which further operation of the unit or ticket issuer devices associated therewith is halted.

Assuming, for the time being, that the take-off gear 7 is stationary (because no transaction impulses are being received by magnets 5) it will hold the gear wheel 62 stationary against the urging of its spring 68, and the peg 61 (by impeding peg 60) will similarly hold the counter wheel 8 stationary against the urging of the slipping clutch. When a transaction is to be counted, the take-off gear 7 will be free to rotate by an equivalent amount, and will be so rotated by the wheel 62 under the urging of its spring 68. This spring drive for wheel 62 is provided to give that wheel the ability for a practically instantaneous and initially rapid motion response to freeing of wheel 7. This obviates the motion of wheel 62 being dependent upon the more leisurely speed "pick-up" of the slipping clutch. Once the wheel 62 has moved "forward" the slipping clutch causes the counter wheel 8 to rotate until its peg 60 catches up with peg 61. In this catching up movement the counter (for the time being in working position) is operated, and rotation of sleeve 59 will bring the spring 68 back to its original tension in readiness for a next actuation of wheel 62. If the slipping clutch should fail to operate, the wheel 62 will get so far ahead of wheel 8 that the grub screw 64 acting in slot 65 will cause an endwise movement of sleeve 63 which will result in the slip ring 70 closing the contacts 71, thus bringing operation of the installation to a halt.

I claim:

1. In a race totalizator adding unit having a frame, a main counter wheel rotatably mounted in said frame and drive mechanisms connected to said counter wheel for rotating same in correspondence with the count to be recorded, two brackets pivoted on said frame, two counters each including an operating shaft with a drive pinion thereon respectively mounted on said brackets, a tension spring connected to both brackets and biasing same toward each other and with the drive pinions of the counters thereon into operative connection with the main counter wheel, follower arms respectively connected to said brackets, and a cam rotatably mounted in said frame and having identical lobes displaced by 180 degrees engaged respectively by said follower arms.

2. In a race totalizator adding unit having a frame, a main counter wheel rotatably mounted in said frame and drive mechanisms connected to said counter wheel for rotating same in correspondence with the count to be recorded, two brackets pivoted on said frame, two counters each including an operating shaft with a drive pinion thereon respectively mounted on said brackets, arms secured to said brackets and rotatably mounting idler wheels in contact respectively with said drive pinions, a tension spring connected to both brackets and biasing same toward each other and with the idler pinions into contact with the main counter wheel, follower arms respectively connected to said brackets, and a cam rotatably mounted in said frame and having identical lobes displaced by 180 degrees engaged respectively by said follower arms.

3. In a race totalizator adding unit having a frame, a main counter wheel rotatably mounted in said frame and drive mechanisms connected to said counter wheel for rotating same in correspondence with the count to be recorded, two brackets pivoted on said frame and each movable from an inoperative position to an operative position, two counters each including an operating shaft with a drive pinion thereon respectively mounted on said brackets, a tension spring connected to both brackets and biasing same toward each other and into operative position with the drive pinions of the counters thereon into operative connection with the main counter wheel, carrier levers pivoted on said frame in close proximity to said brackets, shutters mounted on said carrier levers and slidably positioned with respect to said counters, striker pins mounted on said brackets and cooperating with the carrier levers to push the shutter over the counter as the respective bracket is swung to the operative position, follower arms respectively connected to said brackets, and a cam rotatably mounted in said frame and having identical lobes displaced by 180 degrees engaged respectively by said follower arms.

4. In a race totalizator adding unit having a frame, a main counter wheel rotatably mounted in said frame and drive mechanisms connected to said counter wheel for rotating same in correspondence with the count to be recorded, two brackets pivoted on said frame and each movable from an inoperative position to an operative position, two counters each including an operating shaft with a drive pinion thereon respectively mounted on said brackets, a tension spring connected to both brackets and biasing same toward each other and into operative position with the drive pinions of the counters therein into operative connection with the main counter wheel, leaf springs mounted on said frame and each having a pawl tooth adapted to engage the drive pinion to hold same stationary when the respective bracket is swung to the inoperative position, follower arms respectively connected to said brackets, and a cam rotatably mounted in said frame and having identical lobes displaced by 180 degrees engaged respectively with said follower arms.

AWDRY FRANCIS JULIUS.

REFERENCES CITED

The following references are of record in the file of this patent:

UNITED STATES PATENTS

| Number | Name | Date |
|---|---|---|
| 388,116 | Burroughs | Aug. 21, 1888 |
| 1,374,762 | Poole | Apr. 12, 1921 |
| 1,521,137 | Veeder | Dec. 30, 1924 |
| 1,948,368 | Carr | Feb. 20, 1934 |
| 2,084,396 | Hennessy | June 22, 1937 |

FOREIGN PATENTS

| Number | Country | Date |
|---|---|---|
| 253,734 | Great Britain | June 24, 1926 |